(12) United States Patent
Roskopf

(10) Patent No.: US 11,554,795 B2
(45) Date of Patent: Jan. 17, 2023

(54) METHOD FOR OPERATING A DRIVER ASSISTANCE SYSTEM OF AN EGO VEHICLE HAVING AT LEAST ONE SURROUNDINGS SENSOR FOR DETECTING THE SURROUNDINGS OF THE EGO VEHICLE, COMPUTER READABLE MEDIUM, SYSTEM AND VEHICLE

(71) Applicant: Bayerische Motoren Werke Aktiengesellschaft, Munich (DE)

(72) Inventor: Andre Roskopf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 341 days.

(21) Appl. No.: 16/957,792

(22) PCT Filed: Apr. 30, 2019

(86) PCT No.: PCT/EP2019/061089
§ 371 (c)(1),
(2) Date: Jun. 25, 2020

(87) PCT Pub. No.: WO2019/211293
PCT Pub. Date: Nov. 7, 2019

(65) Prior Publication Data
US 2021/0061311 A1    Mar. 4, 2021

(30) Foreign Application Priority Data
May 2, 2018   (DE) .................... 10 2018 206 743.0

(51) Int. Cl.
*G06T 7/246*   (2017.01)
*G06K 9/62*    (2022.01)
(Continued)

(52) U.S. Cl.
CPC ........ *B60W 60/0051* (2020.02); *B60W 50/06* (2013.01); *G06K 9/6217* (2013.01);
(Continued)

(58) Field of Classification Search
CPC ............. B60W 60/0051; B60W 50/06; B60W 2554/40; G06K 9/6217; G06K 9/6268;
(Continued)

(56) References Cited

U.S. PATENT DOCUMENTS 11,363,031 B2 *  6/2022  Carnes, III .......... H04L 63/1416
2013/0131918 A1 *  5/2013  Hahne .................. G08G 1/0962
                                                        701/36
(Continued)

FOREIGN PATENT DOCUMENTS

DE    10 2006 059 068 A1    6/2008
DE    10 2012 009 297 A1   12/2012
(Continued)

OTHER PUBLICATIONS

ByeoungDo Kim et al., "Probabilistic Vehicle Trajectory Prediction over Occupancy Grid Map via Recurrent Neural Network", 2017 IEEE 20th International Conference on Intelligent Transportation Systems (ITSC): Workshop, pp. 39-404 (Year: 2017).*
(Continued)

*Primary Examiner* — Ming Y Hon
(74) *Attorney, Agent, or Firm* — Crowell & Moring LLP

(57) ABSTRACT

A driver assistance system of an ego vehicle is operated. The ego vehicle has at least one surroundings sensor for detecting the surroundings of the ego vehicle. Movements of multiple vehicles are detected with the at least one surroundings sensor in the surroundings of the ego vehicle. A movement model is generated based on the detected movements of the respective vehicles. A traffic situation is ascertained and a probability of correct classification of the traffic (Continued)

situation on the basis of the generated movement model by a machine learning method. The traffic situation and the probability of the correct classification of the traffic situation are ascertained by the machine learning method on the basis of the learned characteristic features of the movement model. The driver assistance system of the ego vehicle is adapted to the ascertained traffic situation.

10 Claims, 2 Drawing Sheets

(51) Int. Cl.
  *B60W 60/00* (2020.01)
  *B60W 50/06* (2006.01)
  *G06N 20/00* (2019.01)
  *G06N 3/08* (2006.01)
  *G06V 20/58* (2022.01)
  *G06V 10/82* (2022.01)
  *G06V 20/54* (2022.01)

(52) U.S. Cl.
  CPC ............ *G06K 9/6268* (2013.01); *G06N 3/08* (2013.01); *G06N 20/00* (2019.01); *G06T 7/251* (2017.01); *G06V 10/82* (2022.01); *G06V 20/54* (2022.01); *G06V 20/58* (2022.01); *G06V 20/584* (2022.01); *B60W 2554/40* (2020.02); *G06T 2207/20084* (2013.01); *G06T 2207/30252* (2013.01)

(58) Field of Classification Search
  CPC ........ G06K 9/6271; G06N 3/08; G06N 20/00; G06T 7/251; G06T 2207/20084; G06T 2207/30252; G06V 10/82; G06V 20/54; G06V 20/58; G06V 20/584; G06V 20/56
  See application file for complete search history.

(56) References Cited

U.S. PATENT DOCUMENTS

| | | | |
|---|---|---|---|
| 2014/0005907 A1* | 1/2014 | Bajpai | B60W 10/18 701/96 |
| 2017/0291560 A1* | 10/2017 | Schroeder | B60T 17/22 |
| 2018/0043890 A1 | 2/2018 | Keller et al. | |
| 2018/0136000 A1* | 5/2018 | Rasmusson, Jr. | G05D 1/0044 |
| 2019/0221121 A1* | 7/2019 | Guo | G06V 10/82 |
| 2019/0303686 A1* | 10/2019 | Guo | G06K 9/6201 |
| 2019/0337508 A1* | 11/2019 | Foltin | B60W 30/08 |
| 2020/0234088 A1* | 7/2020 | Taha | G06K 9/627 |
| 2020/0372364 A1* | 11/2020 | Domokos | G06N 3/0472 |
| 2021/0191407 A1* | 6/2021 | Benisch | B60W 60/001 |

FOREIGN PATENT DOCUMENTS

| | | |
|---|---|---|
| DE | 10 2013 213 006 A1 | 1/2015 |
| EP | 3 281 831 A1 | 2/2018 |
| WO | WO 2010/127650 A1 | 11/2010 |

OTHER PUBLICATIONS

International Search Report (PCT/ISA/210) issued in PCT Application No. PCT/EP2019/061089 dated Sep. 10, 2019 with English translation (four (4) pages).

German-language Written Opinion (PCT/ISA/237) issued in PCT Application No. PCT/EP2019/061089 dated Sep. 10, 2019 (five (5) pages).

German-language Search Report issued in German Application No. 10 2018 206 743.0 dated Jun. 25, 2019 with partial English translation (11 pages).

Patel et al., "Predicting Future Lane Changes of Other Highway Vehicles using RNN-Based Deep Models", Mar. 14, 2018, XP055617509, (eight (8) pages).

\* cited by examiner

Where:
$u_1$ = Vehicle positions
$u_2$ = Vehicle velocities
$u_3$ = Vehicle accelerations
$y$ = {Construction site, freeway travel, exit, ...}

METHOD FOR OPERATING A DRIVER ASSISTANCE SYSTEM OF AN EGO VEHICLE HAVING AT LEAST ONE SURROUNDINGS SENSOR FOR DETECTING THE SURROUNDINGS OF THE EGO VEHICLE, COMPUTER READABLE MEDIUM, SYSTEM AND VEHICLE

BACKGROUND AND SUMMARY OF THE INVENTION

The disclosed subject matter relates to a method for operating a driver assistance system of an ego vehicle having at least one surroundings sensor for detecting the surroundings of the ego vehicle. The disclosed subject matter furthermore relates to a computer-readable medium, a system, and a vehicle comprising the system for operating a driver assistance system of an ego vehicle having at least one surroundings sensor for detecting the surroundings of the ego vehicle.

Current vehicles use the objects surrounding the vehicle, items of position information, or map data for the situation interpretation. The objects surrounding the vehicle are usually specified by a surroundings model of the vehicle. WO 2010/127650 A1 describes a method for processing sensor data of a vehicle. The sensor data are analyzed by means of an occupancy grid. DE 10 2006 059 068 A1 describes a method for interpretation of a traffic situation, in which a location of an object with respect to a lane can be used for the interpretation of the traffic situation. Objects can be concealed, however, and are thus not available for the interpretation of the traffic situation. Furthermore, satellite-based position data and map data of concealed objects are frequently too inaccurate or are not up-to-date enough to be able to use the concealed objects for the interpretation of the traffic situation.

It is therefore an object of the disclosed subject matter to interpret a traffic situation more efficiently. It is furthermore an object of the disclosed subject matter to operate a driver assistance system of a vehicle in an improved manner with respect to a traffic situation.

According to a first aspect, the disclosed subject matter is distinguished by a method for operating a driver assistance system of an ego vehicle having at least one surroundings sensor for detecting the surroundings of the ego vehicle. The ego vehicle can be a vehicle driving in a partially automated, highly automated, or fully automated manner. The surroundings sensor can be a radar sensor, a laser sensor, a camera sensor, and/or an ultrasonic sensor. The method comprises a detection of movements of multiple vehicles using the at least one surroundings sensor in the surroundings of the ego vehicle. The vehicles can travel on the lane of the ego vehicle and/or one or more adjacent lanes and can be detected by the at least one surroundings sensor. The method generates a movement model by means of the detected movements of the respective vehicles, wherein the movement model comprises movements between the respective vehicles among one another and movements between the respective vehicles and the ego vehicle. The method determines a traffic situation and a probability of a correct classification of the traffic situation based on the generated movement model by means of a machine learning method, wherein one movement feature or multiple movement features of the generated movement model, which are characteristic for the traffic situation, are learned by means of the machine learning method, and wherein the traffic situation and the probability of the correct classification of the traffic situation are determined by means of the machine learning method based on the learned characteristic features of the movement model. The method adapts the driver assistance system of the ego vehicle to the determined traffic situation.

A driver assistance system can advantageously be operated more efficiently in that the traffic situation is determined and/or classified more precisely. The movement model can result in a higher level of reliability in the evaluation of a traffic situation, since characteristic features of a road and/or of a lane cannot be concealed, inaccurate items of position information of the ego vehicle do not have to be used, and/or inaccurate or not up-to-date map data do not have to be used. Because the movement model describes vehicle interactions, a traffic situation can be detected and determined by the vehicle interactions of the vehicles in the surroundings of the ego vehicle. The ego vehicle can classify a traffic situation by means of the vehicle interactions and orient the driver assistance system to the classified traffic situation. For example, the driver assistance system can be preconditioned, so that the driver assistance system can execute a driving maneuver more precisely and more safely for occupants of the ego vehicle.

According to one advantageous design, a movement can comprise at least one position, a velocity, and a positive or negative acceleration of the vehicle.

According to a further, advantageous design, the driver assistance system of the ego vehicle can be adapted to the determined traffic situation ahead of a position of the ego vehicle, at which the driver assistance system of the ego vehicle executes a maneuver with respect to the traffic situation. In this way, the driver assistance system can adjust itself proactively to the recognized traffic situation and prepare a maneuver in a timely manner.

According to a further, advantageous design, the traffic situation can be specified by one or more characteristic features of the movement model.

According to a further, advantageous design, a characteristic feature of the movement model can be a distance, a distance change, an acceleration change, a position change, and/or a velocity change between two or more vehicles of the surroundings and/or between a vehicle of the surroundings and the ego vehicle.

According to a further, advantageous design, generating the movement model by means of the detected movements of the respective vehicles can comprise a training of a machine learning method, and determining the traffic situation and the probability of the correct classification of the traffic situation based on the generated movement model can be performed by means of the trained machine learning method. In this way, a traffic situation can be efficiently recognized by the ego vehicle.

According to a further, advantageous design, the machine learning method can be a recurrent neural network, and the recurrent neural network can comprise multiple long short-term memory units. The traffic situation can be learned efficiently in this way.

According to a further aspect, the disclosed subject matter is distinguished by a computer-readable medium for operating a driver assistance system of an ego vehicle having at least one surroundings sensor for detecting the surroundings of the ego vehicle, wherein the computer-readable medium comprises instructions which, when executed on a computer or a control unit, cause the computer or the control unit to execute the above-described method.

According to a further aspect, the disclosed subject matter is distinguished by a system for operating a driver assistance system of an ego vehicle having at least one surroundings sensor for detecting the surroundings of the ego vehicle, wherein the system is configured to execute the above-described method.

According to a further aspect, the disclosed subject matter is distinguished by a vehicle comprising the above-described system for operating a driver assistance system of an ego vehicle having at least one surroundings sensor for detecting the surroundings of the ego vehicle.

Further features of the disclosed subject matter result from the claims, the figures, and the description of the figures. All features and feature combinations mentioned above in the description and the features and feature combinations mentioned hereafter in the description of the figures and/or solely shown in the figures are usable not only in the respective specified combination, but rather also in other combinations or alone.

A preferred example embodiment of the disclosed subject matter is described hereafter on the basis of the appended drawings. Further details, preferred designs, and refinements of the disclosed subject matter result therefrom.

DETAILED DESCRIPTION OF THE DRAWINGS

Figure 1:
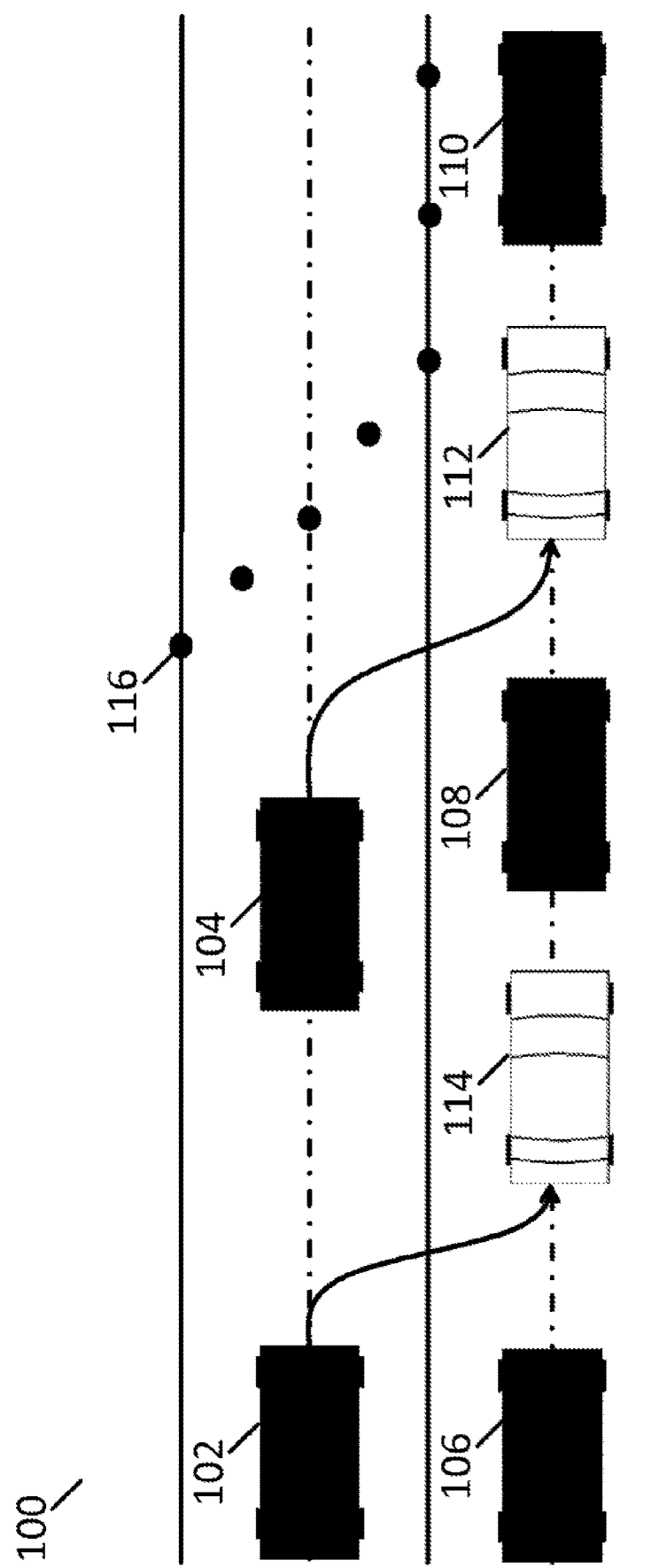
FIG. 1 shows an example traffic situation.

In detail, FIG. 1 shows an example traffic situation 100 having multiple vehicles. The traffic situation 100 shows a narrowing of a roadway from two lanes to one lane. The traffic situation 100 occurs, for example, at construction sites, accident situations, at the end of freeways or passing regions of main roads, where the roadway is frequently narrowed from two or more lanes to one lane. An ego vehicle 102 can detect movements, i.e. positions, velocities, and accelerations, of vehicles 104 to 114 in the surroundings of the ego vehicle 102 by one or more surroundings sensors of the ego vehicle 102. In the traffic situation 100, the ego vehicle 102 can detect a vehicle 104, which travels on the same lane as the ego vehicle 102 and merges into a gap between a vehicle 108 and a vehicle 112.

For this purpose, the vehicle 104 changes the lane. Furthermore, the ego vehicle 102 can detect a vehicle 106, which travels substantially in parallel to the ego vehicle 102. Furthermore, the ego vehicle 102 can detect a gap between the vehicle 106 and the vehicle 114, into which the ego vehicle 102 can merge.

Figure 2:
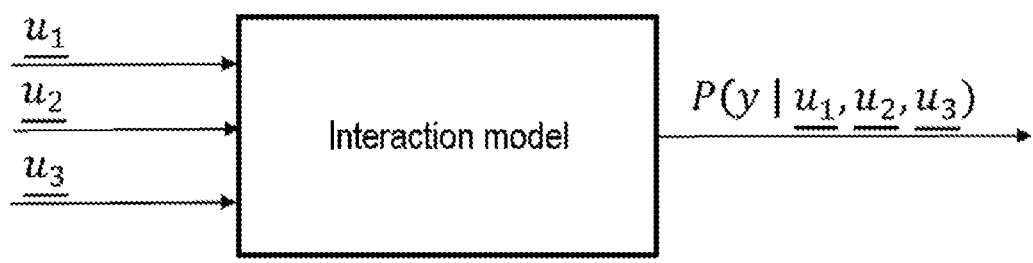
FIG. 2 shows a schematic structure of a method for classifying a traffic situation.

The ego vehicle 102 can generate a movement model, also referred to as an interaction model hereafter, from the detected movements of the respective vehicles 104 to 114. FIG. 2 shows a schematic structure of a method 200 for classifying a traffic situation. As shown in FIG. 2, the positions $u\_1$, the velocities $u\_2$, and the accelerations $u\_3$ of the respective vehicles 104 to 114 can be used as input data of the method. The ego vehicle 102 generates, based on the input data, a movement or interaction model. For this purpose, the respective movements, i.e. the respective positions $u\_1$, the velocities $u\_2$, and the accelerations $u\_3$, of the vehicles 104 to 114 are related to the ego vehicle 102 and to one another.

In detail, the ego vehicle 102 can generate the movement model in that a machine learning method, preferably a recurrent neural network or a recurrent neural network having long short-term memory units (also called LSTM network), or another machine learning method is trained based on the input data, for example the respective positions $u\_1$, the respective velocities $u\_2$, and the respective accelerations $u\_3$ of the vehicles 104 to 114. The machine learning method is preferably trained for a specific traffic scenario, for example traffic scenario 100. For example, the machine learning method can learn characteristic movement features of the vehicles 104 to 114 and of the ego vehicle 102, for example characteristic relative movements of the vehicles 104 to 114 and of the ego vehicle 102, by way of the training of the machine learning method.

In the example traffic situation 100 from FIG. 1, the machine learning method can learn during the training of the machine learning method that vehicle 112 still follows the vehicle 110, i.e. the distance between the vehicle 112 and the vehicle 110 remains approximately equal, the relative velocity is close to 0, and the position of vehicle 112 is behind the position of vehicle 110 from the viewpoint of the ego vehicle 102, and that the further vehicles 108, 114, 106 change the relative positions thereof due to the merging of vehicle 104 into the gap between vehicle 108 and vehicle 112, i.e. the distances of the ego vehicle 102 to the vehicles 108, 114, and 106 change, the relative velocity is not equal to 0, and the positions of the vehicles 108, 114, and 106 change in relation to the ego vehicle 102.

The training of the machine learning method can be executed by the ego vehicle 102 or a server outside the ego vehicle 102. If the training of the machine learning method is executed outside the ego vehicle 102, the ego vehicle 102 can transmit the input data, for example the respective velocities $u\_2$, and the respective accelerations $u\_3$ of the vehicles 104 to 114 and of the ego vehicle 102, to the server and receive the trained machine learning method from the server. The ego vehicle 102 can generate the movement model for a traffic situation, for example traffic situation 100, by way of the transmission of the input data to the server and the reception of the trained machine learning method from the server.

The ego vehicle 102 can execute the machine learning method, preferably the trained machine learning method, to determine a traffic situation y based on the generated movement model. The trained machine learning method can recognize one or more movement features of the generated movement model which are characteristic for the traffic situation and determine and/or classify the traffic situation using the characteristic movement features. For example, the trained machine learning method can conclude, in the case of a traffic situation vehicle x follows vehicle y, or vehicle x merges behind vehicle y and further characteristic movement features, a traffic situation, for example as shown in FIG. 1, to classify the traffic situation. In addition to the traffic situation y, the ego vehicle 102 can determine a probability P which specifies with which reliability the traffic situation is correctly assessed.

A construction site is shown in the traffic situation of FIG. 1, in which the lanes are unified to form one lane. Based on the positions, the velocity, and the accelerations of the further vehicles 104 to 114, the ego vehicle 102 can learn that the velocities in the traffic situation are low in comparison to a velocity on the roadway without construction site. Furthermore, the distances between the further vehicles 106, 108, 110, 112, 114 and the further vehicle 104 and the ego vehicle 102 are characterized by small distances. Furthermore, mostly short-term negative accelerations occur in the ego vehicle 102 and the further vehicles 104 to 114. The ego vehicle 102 can use the learned characteristic movement features to conclude a construction site on the traffic situation and specify a probability of how reliable the assessment of the traffic situation is. The ego vehicle can then adapt the driver assistance system of the ego vehicle to the determined traffic situation.

The ego vehicle can advantageously detect the traffic situation without the surroundings sensor or sensors of the ego vehicle having to detect traffic control objects such as, for example, pylons or other traffic control signs. The interpretation of the traffic situation on the basis of the movement model and the vehicle interactions described in the movement model enables a more reliable determination of the traffic situation in comparison to a determination by means of map data or satellite-based position data.

In addition to the traffic situation construction site, the ego vehicle can detect further traffic situations with the aid of the learned characteristics without the surroundings sensors of the ego vehicle having to completely detect the surroundings. For example, the ego vehicle can detect freeway travel with the aid of characteristic distances, velocity, and accelerations of the movement model and adapt a driver assistance system of the ego vehicle accordingly.

LIST OF REFERENCE NUMERALS 100 traffic situation
102 ego vehicle
104 vehicle
106 vehicle
108 vehicle
110 vehicle
112 vehicle
114 vehicle
116 pylons
200 schematic structure of a method

What is claimed is:

1. A method for operating a driver assistance system of an ego vehicle having at least one surroundings sensor for detecting the surroundings of the ego vehicle, the method comprising:
   detecting movements of multiple vehicles using the at least one surroundings sensor in the surroundings of the ego vehicle;
   generating a movement model based on the detected movements of the respective vehicles, wherein
      the movement model comprises movements between the respective vehicles among one another and movements between the respective vehicles and the ego vehicle;
   determining a traffic situation and a probability of a correct classification of the traffic situation based on the generated movement model by a machine learning method, wherein
      one or more movement features of the generated movement model which are characteristic for the traffic situation are learned by the machine learning method, and
      the traffic situation and the probability of the correct classification of the traffic situation are determined by the machine learning method based on the learned characteristic features of the movement model; and
   adapting the driver assistance system of the ego vehicle to the determined traffic situation.

2. The method according to claim 1, wherein
the detected movements of the respective vehicles comprise positions, velocities, and positive or negative accelerations.

3. The method according to claim 1, wherein
the driver assistance system of the ego vehicle is adapted to the determined traffic situation ahead of a position of the ego vehicle, at which the driver assistance system of the ego vehicle executes a maneuver with respect to the traffic situation.

4. The method according to claim 1, wherein
the traffic situation is specified by one or more characteristic features of the movement model.

5. The method according to claim 1, wherein
a characteristic feature of the movement model is one or more of a distance, a distance change, an acceleration change, a position change, a velocity change between at least two vehicles of the surroundings, or a velocity change between one vehicle of the surroundings and the ego vehicle.

6. The method according to claim 1, wherein
generating the movement model based on the detected movements of the respective vehicles further comprises training of a machine learning method, wherein
   the step of determining the traffic situation and the probability of the correct classification of the traffic situation based on the generated movement model is performed by the trained machine learning method.

7. The method according to claim 1, wherein
the machine learning method is a recurrent neural network; and
the recurrent neural network comprises multiple long short-term memory units.

8. A non-transitory computer-readable medium comprising instructions for operating a driver assistance system of an ego vehicle having at least one surroundings sensor for detecting the surroundings of the ego vehicle, the instructions operable, when executed by one or more computing systems, to:
   perform the method according to claim 1.

9. A system for operating a driver assistance system of an ego vehicle having at least one surroundings sensor for detecting the surroundings of the ego vehicle comprising:
   a processor;
   a memory in communication with the processor, the memory storing a plurality of instructions executable by the processor to cause the system to:
      perform the method according to claim 1.

10. A vehicle comprising the system for operating a driver assistance system of an ego vehicle having at least one surroundings sensor for detecting the surroundings of the ego vehicle according to claim 9.

* * * * *